Figure 1:
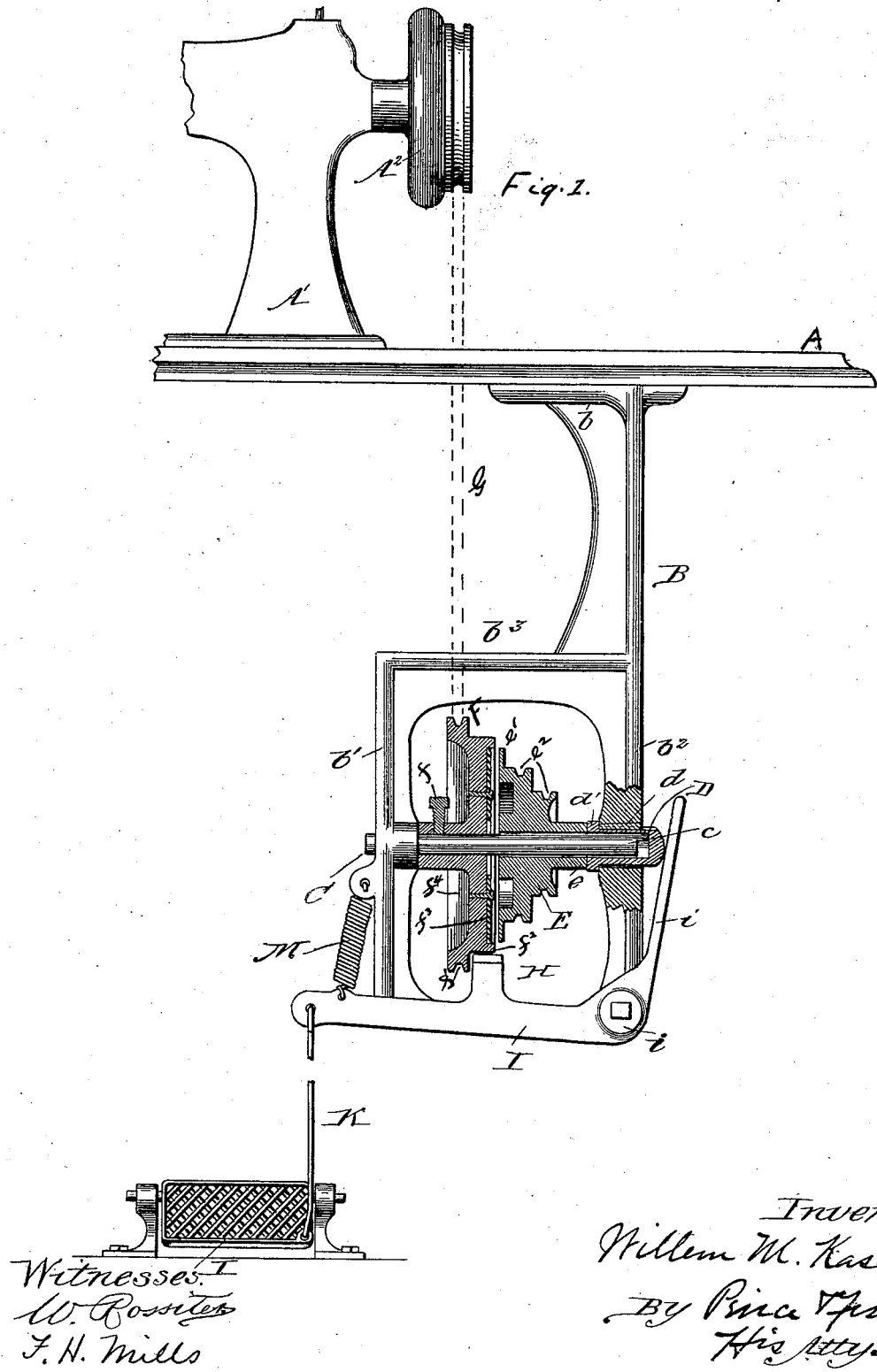

(No Model.) 2 Sheets—Sheet 1.

W. M. KASEY.
CLUTCH AND BRAKE MECHANISM.

No. 365,439. Patented June 28, 1887.

Witnesses:
W. Rossiter
F. H. Mills

Inventor.
Willem M. Kasey
By Pince & Fishu
His Attys.

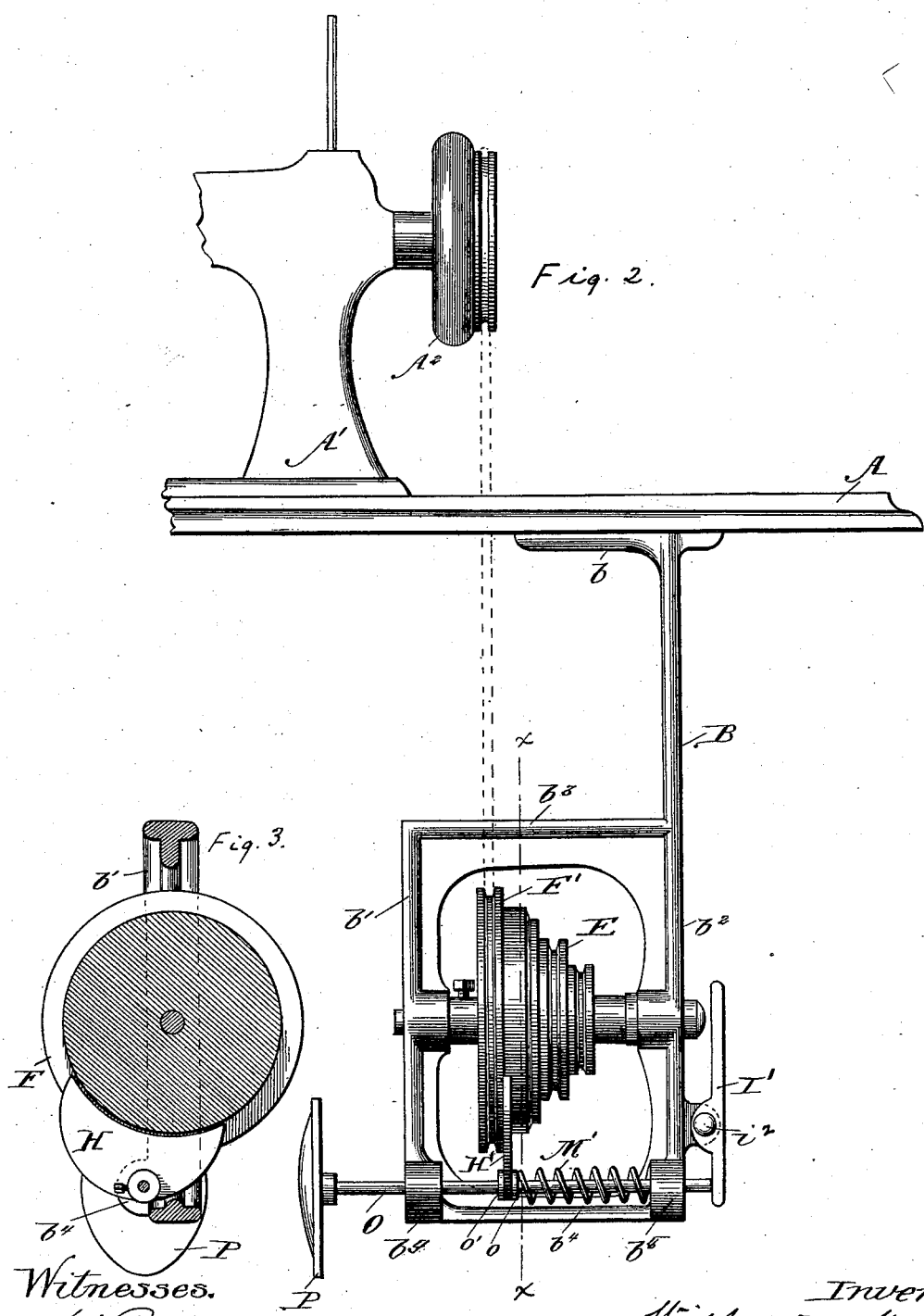

UNITED STATES PATENT OFFICE.

WILLEM M. KASEY, OF CHICAGO, ILLINOIS, ASSIGNOR OF TWO-THIRDS TO JAMES T. BENNETT AND FRANK J. KASEY, BOTH OF SAME PLACE.

CLUTCH AND BRAKE MECHANISM.

SPECIFICATION forming part of Letters Patent No. 365,439, dated June 28, 1887.

Application filed February 15, 1886. Serial No. 192,054. (No model.)

*To all whom it may concern:*

Be it known that I, WILLEM M. KASEY, of Chicago, Illinois, have invented certain new and useful Improvements in Combined Clutch and Brake Mechanism, of which I do declare the following to be a full, clear, and exact description, reference being had to the accompanying drawings, forming part of this specification.

My present invention has relation to the improvement in that class of clutch devices particularly used in connection with sewing-machines run by power, whereby the machine can be conveniently and instantly thrown into and out of gear with the source of power; and particularly does it relate to such devices as are provided with combined clutch and brake mechanism, whereby when the machine is thrown out of gear a brake will be applied to stop its further movement.

My invention consists in the novel combination of parts, hereinafter described, illustrated in the accompanying drawings, and particularly defined in the claims at the end of this specification.

Figure 1 is a view in central vertical section, parts being shown in elevation, of my improved clutch and brake mechanism. Fig. 2 is a view in front elevation of a somewhat modified form of my invention. Fig. 3 is a view in vertical section on line $x\ x$ of Fig. 2.

A designates the ordinary table of a sewing-machine, and A' denotes the machine-standard that sustains the shaft whereon the usual drive-pulley, $A^2$, is carried. To the under side of the table A is bolted the base $b$ of the journal-frame or standard B, the lower portion of which is formed with the parallel side bars, $b'$ and $b^2$, connected at top and bottom, respectively, by the cross-bars $b^3$ and $b^4$.

Within the side bars, $b'$ and $b^2$, suitable openings are formed, wherein are sustained the ends of the shaft C, the outer end, $c$, of this shaft being journaled in the cup-shaped sleeve D, that is held in a manner permitting its lateral movement within the opening of the side bar, $b^2$. This sleeve D is provided, preferably, with a suitable groove to receive the rib $d$, to prevent the turning of the sleeve with the shaft C, and has its inner end furnished with the annular flange $d'$, that bears against the reduced portion or hub $e$ of what I designate the "friction and belt wheel" E. This wheel E is laterally movable upon the shaft C, and upon its inner side is provided with the friction face or plate $e'$, while its periphery is furnished with suitable grooves or spaces, $e^2$, to receive the driving-belt that leads from the power-shaft. (Not shown.)

Upon the shaft C, and preferably keyed thereto by the set-screw $f$, is the main belt-pulley F, the periphery of which is provided with the belt groove or space $f'$, to receive the belt G, that leads to the usual drive-pulley, $A^2$, of the machine. The periphery of the belt-pulley F is also provided with the flat face $f^2$, whereon the brake H will bear, and the inner face of this pulley is preferably recessed to receive the friction-disks $f^3$, of leather or rubber, that are held in place by the screws $f^4$ and engage with the friction face or plate $e'$ of the wheel E.

To the lower part of the frame B is pivoted, as at $i$, the elbow-lever I, the upper arm, $i'$, of which is adapted to bear upon and force inwardly the sliding sleeve D when the friction-wheel E is to be brought into gear with the main belt-pulley F.

The brake H in the construction shown in Fig. 1 is preferably formed as an extension on the lower arm of the lever I, and may be furnished with a suitable brake-shoe to bear upon the brake-surface of the belt-pulley F. The end of the lower arm of the lever I is suitably connected, as by a rod, K, with the treadle L, and by a spring, M, with the frame B.

From the construction as above defined the operation will be seen to be as follows, assuming the parts to be in the relative position shown in Fig. 1: If, now, the treadle L be depressed, the rod K will cause the elbow-lever I, through the medium of the sleeve D, to force the friction and belt wheel E into frictional engagement with the main belt-pulley F, thus causing this pulley to revolve in unison with the wheel E and impart movement to the machine. If, now, the pressure on the treadle L be relieved, the spring M will retract the elbow-lever I, thereby releasing the wheel E from its connection with the pulley F, and at the same time bringing the brake H to bear upon the periphery of this pulley to check its further movement and stop the machine.

In the modified construction illustrated in Figs. 2 and 3 the construction of parts is the same as that above described, save in the following particulars: The lever I', that serves to force the friction-wheel E into gear with the belt-pulley F, is a straight lever pivoted at $i^2$ to the side bar, $b^2$, of the frame B, and against the lower end of this lever bears the end of the rod O, that is provided at its outer end with the knee-plate P, against which the knee of the operator will bear when motion is to be imparted to the machine. This rod O is sustained in a manner free to slide in suitable perforations formed in the enlargements $b^4$ of the frame B, and between the fixed rings or sleeves $o$ and $o'$ of the rod is held the brake H', and upon this rod also, between the enlargement $b^4$ and ring $o$, is sustained the coil spring M', which serves to relieve the engagement of the friction-wheel E and main belt-pulley F and at the same time to force the brake H' against the brake-surface of the main belt-pulley. In this modified construction the brake-surface of the pulley F is formed on the side of that portion of the pulley that carries the belt, and the brake is preferably formed of somewhat crescent shape, so as to better engage said surface. From this construction it will be seen that when the operator presses inward the knee-plate P the movement of the rod O will cause the pivoted lever I' to force the friction-wheel E into engagement with the main belt-pulley F, and when the pressure upon the knee-plate is withdrawn the coiled spring M' will at once retract the rod O, thus allowing the wheel E and pulley F to disengage, at the same time causing the brake H' to bear against the brake-surface of the main-belt pulley F.

I am well aware that combined clutch and brake devices for sewing-machines have been heretofore constructed in which an elbow-lever connected with the machine-treadle and provided with a brake served to throw a constantly-driven clutch pulley and spindle into frictional engagement with a driving-wheel affixed to the end of the main shaft of the machine. An example of this type of machine is illustrated in Patent No. 278,601, granted to C. H. Rohde, May 29, 1883. I am also aware that it has been heretofore proposed to construct a windlass the winding-drum of which was loosely held upon a constantly-driven shaft to which was keyed a friction gear-wheel for imparting movement to the drum when the end of said drum was forced into engagement with said wheel, and that in said windlass the constantly-driven shaft was provided at one end with a sliding sleeve fixed thereto and revolving therewith, said sleeve serving to force the drum into engagement with the friction-wheel and the shaft when the outer end of said sleeve was pressed inward by a screw-lever. Such construction of machine is illustrated in Patent No. 39,068, granted to E. B. Requa, June 30, 1863; and I am further aware of the construction of hoisting-machine illustrated in Patent No. 296,864, granted to J. and T. McNeill, April 15, 1884. To such construction, therefore, I do not wish to be understood as making any claim.

Having thus described my invention, what I claim as new, and desire to secure by Letters Patent, is—

1. A clutch and brake mechanism for sewing-machines, comprising a journal-frame, B, suitable for attachment to the machine-table, a shaft, C, journaled in said frame, a main belt-pulley, F, keyed to said shaft, grooved to receive the driving-belt of the machine, and having a friction-surface to engage with the brake, a combined friction and belt wheel, E, laterally movable and loosely held on said shaft C, a sliding sleeve, D, wherein the end of said shaft is journaled, a pivoted lever for imparting movement to said sleeve, and a brake for engagement with the friction-surface of the main belt-pulley, substantially as described.

2. A combined clutch and brake mechanism comprising a journal-frame, a shaft sustained in said frame, a belt-pulley on said shaft provided with a friction-surface, a laterally movable friction and belt wheel on said shaft, a clutch-lever for forcing said friction-wheel against the belt-pulley, a spring actuated brake for checking the movement of the belt-pulley and a knee-plate for operating the brake and the clutch-lever, substantially as described.

3. A combined clutch and brake mechanism comprising a journal-frame, B, a shaft, C, sustained in said frame, a main belt-pulley, F, on said shaft, provided with a friction-surface for the brake and a friction-surface, $f^2$, for engagement with the friction-wheel, a laterally movable friction-wheel, E, a sleeve, D, a lever, I', a rod, O, a spring, M', a brake, H', and a knee-plate, P, substantially as described.

WILLEM M. KASEY.

Witnesses:
GEO. P. FISHER, Jr.,
JAMES H. PEIRCE.